Patented Apr. 6, 1937

2,075,824

UNITED STATES PATENT OFFICE 2,075,824

ORGANIC MATERIALS STABILIZED BY ANTIOXIDANT FROM GRAINS AND CEREALS

Sidney Musher, New York, N. Y., assignor to Musher Foundation Incorporated, New York, N. Y., a corporation of New York No Drawing. Application February 26, 1935, Serial No. 8,411

6 Claims. (Cl. 87—12)

This invention relates to antioxidants, and particularly to the segregation and utilization of antioxidants, or substances exhibiting marked antioxidative activity, obtained particularly from vegetative sources by the utilization of solvents, particularly of volatile character.

In the prior art attempts have been made to utilize lecithin and similar lipidic substances as a source of antioxidant activity. Aside from the difficulties and expense incurred in the production of such materials as lecithin, it has been found by actual tests that lecithin and similar substances exert no substantial antioxygenic activity.

Attempts have also been made to associate antioxygenic activity with vitamin E containing substances. In such cases, the source of any antioxygenic activity is from materials which contain very high percentages of water, such as 80 to 90% of water, which in and of itself would militate against the possible utilization of such substances as a source commercially for antioxygenic substances. But if any marked antioxygenic activity has been found associated with substances occurring in products containing vitamin E, such association appears to be a rather haphazard or accidental one in view of the fact that it has been found that antioxygenic activity is markedly exhibited by substances substantially free from any amount of vitamin E content.

The present invention is accordingly concerned with the production of antioxygenic substances, particularly by extraction methods, primarily utilizing volatile solvents for the recovery of antioxygenic values from vegetative substances independent of the content of lecithin or similar lipidic substances, or vitamin E, in such vegetative substances.

Other objects include the production of such antioxidative substances, particularly in the form of extracts, by relatively simple and inexpensive means from normally readily available substances.

Still further objects and advantages of the present invention will appear from the more detailed description set forth below, it being understood, however, that this more detailed description is given by way of illustration and explanation only, and not by way of limitation, since various changes therein may be made by those skilled in the art without departing from the scope and spirit of the present invention.

In specification, Serial No. 696,915, filed November 6, 1933, entitled "Stable food products", there is described and claimed the protection of glyceride oil bearing materials, primarily, including oils and fats and mixtures thereof, against oxidative changes, such as those which result in rancidity, by the use of sesame products. Sesame seed is particularly set forth and claimed therein for that purpose, utilizing the sesame seed in any desirable form, such as a flour or pulverized material, or by way of extracts produced from such sesame material and incorporated with the glyceride oil and fat, or similar product. In that specification, crushed sesame seed without segregation of oil from the cake may be incorporated with the oil and/or fat to impart thereto remarkably improved keeping qualities, making the resulting product substantially resistant to development of rancidity, and markedly changing the flavor and odor and other desirable characteristics of the product. As illustrative of such treatment as given in that specification, the crushed sesame seed may be permitted to remain with the oil treated, or after relatively short treatment, such as for 15 minutes at moderate temperatures, for example, 150° C., the sesame seed fibers may be filtered off, or otherwise removed from the treated oil, the latter exhibiting marked keeping qualities, modified flavor and odor, and yielding at the same time a seed cake of valuable edible characteristics, not alone for the ordinary purposes for which seed cakes are employed, but also because of the manner of treatment, available for human consumption. The sesame seed in ground condition retaining the oil with the seed fiber may be added to the desired oil and/or fat in the amount of from 5 to 10%, for example, and in most cases not exceeding 20%, although, of course, higher quantities may be utilized if desired. The wide variety of oils and fats are referred to as utilizable in accordance with the treatments set forth in that specification, including the various animal and vegetable oils, both in refined and unrefined condition, and including such products as lard, tallow, oleo stearin, hydrogenated derivatives, such as solid products, etc., paint oils, etc. Such treated oils and fats very markedly increase their resistance to the development of rancidity, and show a marked decrease in the development of fatty acid content on standing, exhibit improved taste and odor, and show a far greater stabilization of color which occurs coexistent with stabilization against development of rancidity, and which is of importance to the paint industry as well as from an edible standpoint, so that actually by such treatments as set forth in that prior specification, there are produced novel types of oils and fats or mixtures thereof.

In specification, Serial No. 698,543, filed November 17, 1933, for "Fats and oils", there is particularly described and claimed the utilization of other oil containing seeds and nuts than sesame products for the protection of the glyceride oils and fats or mixtures containing the same against development of rancidity, such materials being utilized in a manner analogous to that set forth in connection with the sesame products, and being permitted to remain in the products themselves, or when desired, removed therefrom. The methods of treatment may be by direct infusion as set forth above, or by utilizing solvent extracted components, either by means of volatile solvents or the glyceride oil extracts themselves, from such seed and oil products. Among the nut, seed and fruit products which may be utilized in protecting such glyceride materials against development of rancidity, or other aging changes, there is particularly set forth the use of peanuts, sunflower seed, cottonseed, linseed, cocoanut, etc., utilized in the protection of a wide variety of oils and fats, both animal and vegetable such as those illustrated above. As there pointed out, instead of direct infusion methods, other methods of making extracts of the desirable constituents exhibiting antioxidative activity, from the seeds, nuts or fruits may be utilized as, for example, by the treatment of the crushed seeds, etc., by volatile or other solvents which are then incorporated with the desired oils and/or fats.

In specification, Serial No. 710,727, filed February 10, 1934, entitled "Products from fats and oils and methods of making same", there is particularly described and claimed the protection of glyceride containing materials, such as fats and oils, or mixtures thereof, or materials containing the same, against oxidative changes, such as development of rancidity, by the utilization of non-oil bearing vegetative matter, such non-oil bearing vegetative matter being materials which either contain no oil whatsoever, or only such minor quantities of oil that they do not serve as a source of oil for commercial or industrial use. The materials illustrated therein as non-oil bearing substances that may be employed include oats, rye, barley, hominy, alfalfa, and flours, such as bleached flour and other forms of cereals, as well as ordinary leaves, or even such products as twigs. These non-oil bearing vegetative matters are employed in the manner set forth above for the sesame products, and may be utilized by direct infusion, or the glyceride fat or oil containing materials to protect them against development of rancidity, either with or without removal of the fibers of the products subsequently, or solvent extracted portions of such non-oil bearing vegetative materials may be utilized for protection of the glyceride materials against development of rancidity. In addition to the materials specifically set forth above as utilizable as a source of anti-oxidant material, other examples of non-oil containing vegetative materials given therein include oat meal, both cooked and uncooked, finely ground rice flour, potato flour, and ordinary bleached wheat flour. As there pointed out, the method of direct infusion may be utilized, but other methods of making extracts of the desirable constituents may be utilized, as for example, by the treatment of the non-oil bearing vegetative matter by volatile or other solvents, which are then incorporated with the desired oils and/or fats, and the solvents usually subsequently eliminated. In such cases where volatile solvents are employed, the effect on flavor, aroma and taste in the final product is not as marked as when the direct infusion methods are employed. Flavor, for example, may be lost for the simple reason that removal of the volatile solvent ultimately also removes the flavor and aroma yielding substances as a general rule. Among solvents which are mentioned that may be utilized in the extraction of desired non-oil bearing vegetative materials there are specifically set forth hydrocarbons, acetone, carbon tetrachloride, and other substances of relatively high volatilization value. The antioxidative substances may be utilized in connection with the protection of both edible and non-edible substances against development of oxidative or aging changes of undesirable characteristics.

In specification, Serial No. 733,517, filed July 2, 1934, entitled "Foodstuffs", there is particularly described and claimed the utilization of soya bean products in protecting the glyceride materials against development of oxidative changes such as rancidity, the soya bean material being utilizable in any desired form, either in the form of the whole soya bean material, or a flour made therefrom, or the soya bean cake, as is obtained from expeller or extraction apparatus, for example, in removing most of the fat content of such soya beans, etc., etc.; the manner of use of the soya bean product being similar to that described above in connection with the sesame material, namely either by direct infusion processes, or by the inclusion of solvent extracted components of the soya bean material incorporated with the glyceride material to be protected against development of rancidity. Here again, while direct infusion of the desired fat or oil with the soya bean material is particularly set forth, there is also described extractions of the soya bean material with solvents, including volatile solvents and their utilization for incorporation with the desired fat or oil whether animal or of other character. While as therein stated the various vegetable and animal oils and fats and other oil containing products of glyceride character may be utilized for treatment to protect them against devolpment of rancidity, non-edible substances may also be treated, as well as other substances not necessarily dependent on glyceride oil contents, including, for example, coffee, tobacco, etc. And while soya bean material has been particularly emphasized and claimed therein, analogous types of materials including, for example, oat meal, corn germs, corn cake, whole wheat, castor bean pumace, maple tree leaves, etc., may be utilized as a source of the antioxidant activity or substance.

In specification, Serial No. 799, filed January 7, 1935, entitled "Antioxidants", there is particularly described and claimed the utilization of these vegetative materials, as set forth above, including both the oil containing and non-oil containing substances, and extracts derived from them, in the protection of various types of materials other than the oil or fat containing substances, against oxidative or aging changes. As illustrative of the oil bearing materials utilized as a source of the antioxidant protectants, various oil bearing nuts, seeds, and fruits are referred to including, for example, sesame seed, peanuts, sunflower seed, cottonseed, poppy seed, linseed, cocoanuts, soya bean, castor bean, etc., whereas illustrating the non-oil bearing or substantially non-oil bearing vegetative matters that may be utilized are the various cereals and grains, etc., including oats, wheat, rye, barley, hominy, corn, alfalfa, and their various products such as the flours, bleached or unbleached, and other forms of the grains and cereals, as well as such vegetative materials as ordinary leaves, such as maple tree leaves, and even twigs. Various forms of these products, as noted, may be employed. Illustrating such types of products, for example, there may be utilized the dry, ground soya bean material, or the soya bean cake from which the oil has been expelled, or the highly refined bleached soya bean flour, or the soya bean material in almost any type of form. As set forth in that specification, these various products may be utilized in treating and protecting various types of substances including milk powders, chocolate or other flavored milk products, etc., cheeses, fruit juices, cocoanut juice, egg products, including egg whites and egg yolks, cod livers and oils, coffee and coffee products, yeasts, rubber and rubber compositions, mineral oils and mineral oil distillates including gasoline, lubricating oils, mineral oils, etc., leather, linoleum, paper, textiles, etc. As there pointed out, the utilization of materials for development of antioxidative activity or exhibiting such functions, are not dependent on vitamin E content, nor on the utilization of materials of high moisture content, but the substances are primarily utilized which are of relatively low moisture content, or in many instances practically free from moisture, such vegetative materials nevertheless exhibiting high antioxidative activity. Direct infusion or treatment methods are particularly referred to. Where the fruit juices such as the citrus fruit juices, including orange juice, lemon juice, grape fruit juice, and other juices, such as cocoanut juice, are employed, or liquid milk products, or the mineral oil and mineral oil distillates, including gasoline, lubricating oils, mineral oils, etc. are directly treated with the vegetative material serving as a source of antioxidative material, extracts of said materials may be said to be produced, particularly because in most instances, pronounced antioxidative activity is still retained in the treated products, even though the fibers of the vegetative substances are removed after the direct treatment of the product to be protected.

In specification, Serial No. 3876, filed January 28, 1935, entitled "Prevention of oxidation", the utilization of these various vegetative materials in protecting solid or substantially solid products, particularly when in the form of discrete masses, against development of oxidative or aging changes, is particularly described and claimed. For such purposes the vegetative materials of both the oil containing seeds, nuts and fruits, or derivatives of them, and the substantially non-oil containing vegetative materials, such as cereals and grains, as more particularly described above, may be utilized in the protection of various types of solid products, such as nuts, coffee, oat flakes, cheeses, milk powders, and other milk products, non-edible solid substances, such as rubber, resins, soaps, greases, etc., and drugs, chemicals and pharmaceuticals may be treated in accordance with that invention.

While as there set forth in that specification, the powdered materials or vegetative substance may be directly applied or dusted on, extracts, particularly in volatile solvents, and primarily from which extracts the volatile solvents may be readily eliminated, either before the incorporation of the antioxidant extracted material with the product to be protected, or after the volatile solvent extract has been applied, and substantially immediately removed from the product treated, may be utilized. Particular substances emphasized as a source of antioxidative material include oat flour, barley, hominy, soya bean flour, crushed sesame seed, crushed peanuts, crushed linseed cake, soya bean press cake, castor bean pumace, corn germ cake, corn gluten, etc., coffee, cocoa beans, etc. Solvent extracts of the vegetative materials carrying the antioxidant properties are referred to, particularly the volatile solvent extracts of the cereals and oil bearing seeds, nuts and fruits, or seed or nut cakes. Such solvent extracts include, for example, the alcoholic extracts of the cereal flours, such as oat flour, barley flour, yellow or white hominy, or such oil bearing seed as soya bean flour, or such oil bearing seed press cakes as peanut meal, cottonseed meal, corn meal, etc. As there pointed out, any method of producing the extracts may be used, either batch or continuous, including for example direct contact of the cereals or crushed seeds with ethyl or ordinary alcohol. Where an oil containing material, such as seeds or nuts is being extracted, a solvent is more desirably chosen which does not substantially remove the glycerides from the material, so that the extract is substantially free from oil or fat. Where the material is substantially oil free, any solvent may be utilized. The extract may be filtered to remove residual vegetative fibers, or where presence of the fibers is not undesirable, filtering is not necessary. In some cases, the unfiltered material is more effective in its antioxidant activity, whereas in other cases, as oat flour extract in alcohol, the difference is not so marked. In general, the alcoholic type of extraction media remove considerably less of the oils present than do the gasoline types of extraction media. An alcohol extract of whole pulverized oats is substantially free of oat oil, while a gasoline extract may contain the entire 4 to 5% of oat oil present in the oats. The alcoholic extract of soya bean oil is also substantially free of oil. The gasoline type of extraction may, if desired, be applied to the press cake left after oil expression or expulsion, as for example in the case of the soya bean press cake. But here too, avoidance of the presence of oil may be desirable by utilizing the alcoholic type of extract. The extracts may be utilized as such, or more desirably the volatile solvent may be distilled out, and the residue employed as a concentrate of antioxidant activity. In general, such residues obtained, for example, by vacuum distillation and removal of the alcohol leaves a resultant concentrate of somewhat dark color and agreeable odor, but usually neither the color nor odor materially affects the products with which the concentrate is used, particularly since as a general rule the percentages of such concentrates employed may be very small, as for example from .02 to 1%. As exemplary of such extracts, an ethyl alcohol extract of oat flour can be made by the batch process obtaining 3% of the oat flour during the alcoholic extraction. .1% of such concentrate added to castor oil increases its life from seven to ten-fold. Where the extracts tend to deposit crystals following mixture with a concentrate, such as a liquefied oil or fat, such crystals may, if desired, be removed by filtration. Any of the various extracts may be utilized, the extract in the volatile solvent being applied to the product to be protected against development of rancidity, and the solvent media subsequently evaporated away, if desired. In other cases, the volatile solvent is first removed from the extracted antioxidant material, and the latter in substantially solid or dry condition may be admixed or employed in any of the ways set forth.

In that specification, Serial No. 3876, the invention particularly claimed is the utilization of the vegetative materials in substantially dry condition, whereas the instant application which continues this subject matter from that application, Serial No. 3876, is particularly directed to the utilization of the extracts, particularly in volatile media, for the protection of substances both edible and non-edible, and both glyceride-containing and non-glyceride containing, against the undesired oxidative and aging changes.

By the utilization of extracts of the vegetative materials in lieu of the vegetative materials themselves, many advantages are obtained. It is thus possible to avoid the addition of vegetative material in substantial amounts to the products to be protected against development of oxidative or aging changes. And further particularly due to the fact that extracts are being employed, which extracts are relatively more concentrated in oxidative prevention activity, much smaller quantities of such extracts may be employed than would be necessary where the vegetative materials themselves are added to the products to be protected. Furthermore, in this way, by the utilization of extracts, the avoidance of fibers or other undesired portions of the vegetative materials are eliminated from the products themselves, and no filtration or other steps for removal of such fibers or parts of the vegetative materials undesired in the products are necessary. Further in those cases where change in flavor or odor of the product being treated is not desired, the utilization of the extracts may be employed to avoid any material change in flavor or odor or taste of the product being protected. The same considerations apply with respect to color of the product. Again, by the utilization of extracts, heat treatments or fusion operations where oils, for example, are directly treated with the vegetative materials may be eliminated, and the processes for treating of substances to prevent development of oxidative or aging changes may thus materially be reduced in time and other operative factors. And finally, we may note that by the use of extracts, for example of the cereals and oil bearing seeds, it is possible to operate so that only the material sought from the standpoint of preventing oxidative changes, are eliminated from the cereals or seeds or similar products treated, leaving by-product meals or other substances without substantial loss in value for other purposes. These are some of the principal results which are secured by the utilization of extracts of the vegetative materials exhibiting antioxidative properties, others of material nature being apparent from the specific illustrations of the process and resulting products as given below. There are given below several examples of the production of extracts and their utilization in protecting various substances against oxidative or aging changes.

As a source of the antioxidant material, any of the vegetative matters set forth above may be utilized for recovery by means of solvent extracts, but there is particularly emphasized in this connection the use of cereals and oil bearing seeds, and particularly the cheaper varieties of such products which may be utilized directly as a source for the extracts exhibiting pronounced antioxidative activity, which extracts can be readily utilized for any desired purpose, whereas such cheaper types of cereals or seeds, etc. might not be desirable for direct infusion purposes. In any event, the cereals and oil bearing seeds will be particularly emphasized below as a source of obtaining the antioxidative materials and activities, without implying any direct limitation on the source of materials employed. However, again it is noted as pointed out above, that the invention is particularly concerned with the utilization of materials which do not have high water contents, and in many instances, such as in most of the cereals and grains, even any substantial amount of oil content, yet which substances yield very active antioxidative values.

One of the simplest forms of obtaining a solvent extract of such cereals and crushed seeds, for example, is merely to take an alcoholic extract of them. Any one of the usual types of solvent extraction methods may be used, either continuously or by the batch method. For example, any one of the cereal flours, such as oat flour, barley flour, yellow hominy or white hominy, or such oil bearing seeds as soya bean flour, or such oil bearing seed press cakes as peanut meal, cottonseed meal, corn meal, etc. may be treated merely by extracting with alcohol, such as ethyl alcohol, that portion which is soluble in alcohol. For example, an alcoholic extract of oat flour can be made by the batch process, obtaining 3% of the oat flour by weight in the alcohol extract.

In utilization of such extracts, .1% of the stated concentrate may be added to castor oil, and the life of that castor oil would thereby be increased by anywhere from 7 to 10 times. At the same time, the color of that castor oil would scarcely be changed, and there would be practically no change in flavor, the flavor of freshly deodorized castor oil being practically negligible.

In some cases, the addition of an alcoholic extract to the oil may cause deposition of some crystals. In the case of liquid oil, this may require subsequent filtration. In those cases, however, where the presence of the crystals would not be visible or otherwise objectionable, as where the extract is added to the lard, no filtration would be necessary, whereas in liquid products where the crystals might be visible or otherwise objectionable, filtration may take place. Such filtration operations are, however, an obviously very simple matter.

The alcoholic extracts containing the alcohol or other solvent may be employed directly for incorporation with the material to be protected against development of rancidity, and the solvent subsequently removed, or if desired, the solvent, such as the alcohol, may be removed by distillation, such as vacuum distillation preferably, to produce a product substantially free from the solvent, and in the case of the oat flour extract referred to above, which is exemplary of many such types of extracts produced under the present invention, the resultant concentrate will be found to possess a rather agreeable odor and fairly dark in color. Although the color is usually not sufficient to in any way materially modify the color of the product being treated with such extract to prevent development of rancidity. Such concentrates whether produced by this or similar means may be subjected to further purification if desired.

Such extracts as the alcoholic extracts specifically referred to above, may be used directly and need be employed only in relatively small percentages, for example, in amounts running anywhere from .02% to 1% with, for example, any of the glyceride oils, such as cottonseed oil, corn oil, cocoanut oil, castor oil, cod liver oil, lard, or in such oil containing products as peanut butter, mayonnaise, margarine, whole milk powder, or in such manufactured products wherein loss of flavor or rancidity of the oil may be factors, as in coffee, essential oils, or in inhibiting oxidation in a general sense with non-edible materials, such as in the case of essential oils, rubber, gasoline, etc.

The alcoholic type of extract referred to above is exemplary of a type of extraction media which does not materially dissolve oils that may be present in the vegetative material being utilized as the source of antioxidative substance or activity. And in general where the vegetative material being treated to obtain the extract of antioxidative substance, contains material percentages of oil which it is desired not to introduce into the material to be incorporated therewith for protection against rancidity, these types of solvents which do not extract material percentages of the oil may desirably be employed.

On the other hand, when materials are being utilized as a source of antioxidant activity or substance, which materials do not contain substantial amounts of oil, or when such vegetative materials containing oils have first been treated to expel or to extract the oils therefrom prior to their utilization for the production of the antioxidative extracts, or when the presence of extracted oils in such materials are not considered undesirable, the gasoline types of extract solvent may be employed, since gasoline and similar types of solvents, act to dissolve out any oil which may be present in the vegetative materials. Further, it should be kept in mind that the presence of dissolved oil when extracted with the antioxidative material, may either act to contaminate the product being protected against development of rancidity, or reduce the active percentage of the concentrate with respect to its antioxidant properties. And further such oil which may be present in the antioxidant extract may reduce the effective antioxidant material present.

As exemplary of the different effects obtained with the different types of solvents, if alcohol is used as the solvent for whole pulverized oats, the resultant extracted material contains but little of the oat oil, whereas if gasoline is used as the solvent, the entire oil content of the oats, usually from 4 to 5%, will be present in the extract produced.

These considerations are particularly important when products like soya bean flour is being extracted, which soya bean flour may contain in its uncrushed condition about 20% of soya bean oil, for example. The use of gasoline as a solvent to extract the soya bean oil from the soya bean flour results in removal of the oil present along with the antioxidative materials, whereas the use of alcohol as a solvent for the soya bean flour removes but little if any of the soya bean oil.

As pointed out, gasoline may be used, for example, as a solvent to extract the materials from soya bean press cake after most of the soya bean oil has been removed from the full fat flour by means of expellers or hydraulic presses, or by similar means. The resultant soya bean press case would have about 5% of soya bean oil present, and if this product were then extracted with the gasoline, the resultant oil and other matter removed by the gasoline extraction will show definite antioxygenic activity, and may be used as an antioxidant for blending purposes in the manners described above. However, even here, it may be considered desirable to use alcohol or other type of solvent in which the glyceride oils are only slightly soluble, but in which the other antioxidant materials may be found to be soluble.

In general, in the case of cereal flours, such as oat flour, hominy, barley flour, etc., in which the fatty portion amounts to less than 5%, almost any type of solvent can be used for extraction purposes in view of the small oil content of the material being extracted, but even here it is considered more desirable to use a solvent such as of the alcoholic type in which the fat is insoluble in order that the concentrate will show its maximum content of the antioxidative material.

The extracts produced in accordance with the present invention are of concentrated character, and are obviously much more potent in this respect than the vegetative materials, even the flours themselves, would be. Thus in the treatment of materials, it is possible to utilize a much smaller content of the extract than would be required where the flour itself was being utilized. For example, in connection with cod liver oil, where infusion with let us say 5% of whole pulverized oats would be required to give a certain oxygenic activity, followed by filtering out of the oat fibers, etc., a much smaller amount of extract could be employed without any contamination of the cod liver oil by fibers or similar material. And where it was desired to increase the antioxygenic activity, the percentage of concentrate added can be readily increased without in any way complicating the composition or process.

Furthermore, in connection with such products as the addition of the concentrate to lard, for example, there is no material change in the color or flavor of that lard when the extract is used. On the other hand, even with a material like oat flour, which has very little oil present, and very little effect on the taste or flavor or color of the product treated to protect it against oxidative change, the use of the concentrate or extract may eliminate entirely any noticeable effect on flavor, color, odor, etc.

It will be understood, of course, that in carrying out the present invention it is not necessary to limit the extraction to a single vegetative material as the source of anti-oxygenic activity, but various vegetative materials may be employed if desired to produce a mixed concentrate or successive extractions of different vegetative materials may be made by the same solvent, either to increase the antioxygenic activity of the extract, or to obtain antioxygenic activity of modified character. While as noted above, the various vegetative materials may be employed as a source of antioxygenic activity, it should be kept in mind that not all materials are equal in their sources of antioxygenic activity, nor do they necessarily show the same pronounced activity as against different materials. In some cases, also, there is exhibited a difference in extent of antioxidant activity depending on whether the fibers of the vegetative material from which the antioxydative substances are obtained, are left in the treated material, or whether they are removed. With oat flour, for example, as a source of antioxidative substances or activities, removal of the oat fibers does not make any essentially great difference in the antioxygenic activity, whereas with soya bean material, it has been found in some instances at least that a greater antioxygenic activity is obtainable when the soya bean fibers are left in the material than when they are eliminated. Consequently, mixtures of antioxygenic substances from different sources may desirably be employed, either to enhance the antioxygenic activity of any particular extract, or to obtain antioxygenic activity of more potent character, or of a necessary character in connection with some substances that would be more protected by one type of antioxygenic substance than by another.

Similarly different types of solvents may be utilized to extract the same or different types of vegetative materials, and the extracts containing the antioxygenic substances may be combined. Such combinations of solvents may desirably be employed particularly where the material being extracted as a source of antioxygenic activity contains oil. In such cases for example, the non-oil extracting solvent may be employed that removes the antioxygenic substance after which the oil may be expressed from the vegetative material, and subsequently the gasoline type of extraction for antioxygenic materials be employed. It will be obvious that various combinations of solvents or of vegetative materials may thus be utilized to modify the type and character and activity of the antioxygenic substance which is produced.

As further showing some of the effects obtained with the present invention, it may be noted that a soya bean concentrate added to lard does not particularly change the color of the lard to any appreciable extent, whereas the use of soya bean flour itself with lard does materially affect the color.

On the other hand, an oat flour concentrate carries a great deal of the oat flour flavor as a general rule, particularly when made with alcohol, and the oat flour flavor may desirably be utilized in many cases.

The alcoholic type of extract appears to remove substantially all of the antioxidant from the treated material, particularly the oat flour types of products. For example, almost 10% of the oat flour is removed during the alcoholic extraction, but it appears that .5% of the concentrate is some more effective than 5% of the oat flour itself is. This may be due to the fact that the antioxidant is more soluble in alcohol than it is in the glyceride oils, and may, therefore, be withdrawn more readily for use.

It will be apparent from the considerations given above, that the production of concentrates or extracts exhibiting marked antioxygenic activity, are not limited at all to derivation from substances containing vitamin E. Many of the substances referred to above of vegetative character that can be utilized as a source of antioxygenic activity, are markedly low in vitamin E content. The fact that some antioxidant may be present with materials that contain vitamin E, herefore, appears to be more of a coincidence than any necessary consideration. Substances like oat flour, which are utilized in accordance with the present invention, and which contain a relatively low vitamin E content, nevertheless exhibit a very marked antioxygenic activity, and as compared with other substances of higher vitamin E content, the antioxygenic activity of oat flour and its concentrates or extracts may be very materially higher than extracts of materials that contain even higher vitamin E contents than do the oat products.

Furthermore as illustrative of the fact that the antioxygenic activity produced in accordance with the present invention is not dependent on lecithin content is shown not alone by the fact that many materials may be utilized in accordance with the present invention, which do not show any marked lecithin content, or any lecithin content whatsoever, and also by the following considerations. Egg yolk, which contains a substantial percentage of lecithin and coloring matter, and may be compared with soya bean flour, has been utilized by adding powdered egg yolk to the extent of 10% to lard materials, but it has been found by tests to exhibit substantially no antioxygenic activity.

Specific tests have also been run with lecithin obtained from soya bean material, and it has been found that lecithin in and of itself, or of the analogous phosphatide do not exhibit substantial antioxygenic activity. The following tests were run with the so-called "Swift stability apparatus", which is one of the commonly accepted means for testing stability of oils, and which operates on the basis of allowing a measured quantity of air to bubble through a measured quantity of oil at approximately 208° F. until such time as the oil becomes organoleptically rancid, and then testing for peroxides.

5% of decorticated, finely dehydrated and finely ground soya bean flour in refined lard and unfiltered shows stability of the lard for 18.75 hours and a peroxide value of 34. .11% of lecithin extracted from soya bean flour and utilized in refined lard unfiltered showed a lard stability of only .75 hours, which was substantially the same as the control refined lard with no addition, and a peroxide value of 19 as against a peroxide value of the control refined lard with no addition of 40.

These tests show that there is certainly no comparison between the activity of lecithin in and of itself, even though the lecithin had been extracted from soya bean flour, as compared with the use of soya bean flour. Furthermore, it should be kept in mind that soya lecithin is substantially inactivated when held at temperatures in excess of 160° F., whereas the antioxygenic value of soya bean flour itself is not affected at that, or even higher temperatures.

The following experiments also indicate that the antioxygenic activity of the soya bean flour is not due to the lecithin content. An alcoholic extract of soya bean flour was taken. .6 grams of this alcoholic extract was thoroughly mixed in a mortar with 60 grams of lard (approximately 1%). A whitish gray material was left floating on the lard indicating that the alcoholic extract was not entirely soluble in the lard. The whitish gray material was filtered off on asbestos. The residue remaining on the filter was washed with petroleum ether to wash it free from lard.

The residue together with the asbestos was then taken up with water and filtered to separate the asbestos from the water solution. The water solution was cloudy. Upon evaporation of the water solution the residue was added to refined lard to the extent of 1%. It was found that approximately 70% of the total antioxygenic activity of the concentrate came through in the water extract, and was not previously removed by having been added to refined lard, or by treatment with petroleum ether, but was essentially a water soluble and a non-oil soluble substance. This precludes the antioxidant being lecithin, in view of the fact that lecithin is easily soluble in oil.

It may further be noted that the refined lard which was filtered away from the whitish gray residue referred to herein, had a stability of only 4 hours against a control of two hours, whereas when the whitish gray material was allowed to remain in contact with the oil, even though it was insoluble, the stability was well over 12 hours.

The following results obtained with various alcoholic extracts may be noted in connection with lard.

|  | Hour |
|---|---|
| Control lard under the Swift stability apparatus | 1 |
| Control lard containing 1% alcoholic extract concentrate of oat flour unfiltered | 7½ |
| Control lard containing 1% alcoholic extract concentrate of oat flour filtered | 6½ |
| Control lard containing 1% alcoholic extract concentrate of soya bean flour unfiltered | 5 |
| Control lard containing 1% alcoholic extract concentrate of soya bean flour filtered | 2½ |

In these tests the alcoholic extract of the oats amounted to 10% of the total weight of the oats so that 1% of the concentrate is the approximate equivalent of 10% of the oat flour. As different from the oat concentrate, the soya bean extract amounted to about 20% of the total weight of the soya bean, using alcohol as a solvent and, therefore 1% of the soya bean flour concentrate was not as effective as 1% of the oat flour concentrate.

While the use of organic solvents, particularly of volatile character, has been particularly emphasized above, variations in the manner of producing extracts may be utilized. A soya bean flour concentrate produced in the manner set forth above by means of alcohol was treated with a small amount of water. Immediately a heavy emulsion, presumably due to the presence of the lecithin of the soya bean flour, was formed. Some petroleum ether was added in order to break the emulsion. The mixture was shaken thoroughly, and then found on standing to separate into two layers, part of the material being soluble in the petroleum ether and part in water. Two different concentrates were thus obtained. The petroleum ether extract was found to be principally soya bean oil and possibly soya bean lecithin, since it is recognized that lecithin is soluble in oil but does not appear to be soluble in water. This petroleum ether extract was tested as an antioxidant, and when used to the extent of 1% showed an activity of only 1½ hours as against a one hour control.

The water soluble portion with the water boiled off gave a powdery solid, dark in color, but considerably lighter in color than the original alcoholic extract. This particular concentrate exhibits a spicy taste, and when used to the extent of 1% in lard showed an antioxygenic activity of 9 hours as against a one hour control. It would appear, therefore, that the antioxidant of soya bean flour is more water soluble than it is petroleum ether soluble, and since petroleum ether is the common solvent for fats, the lecithin may be assumed to have gone into the petroleum ether portion rather than into the water portion.

Consequently water may be utilized in producing extracts of the antioxygenic activity or substance from volatile solvent extracts. Thus solvent extracted soya bean oil as commercially made, may merely be shaken with water, for example, in order that the water portion may remove the water soluble antioxidant present in the oil extract, and to obtain from the water solution a soya bean antioxidant concentrate.

While water may be utilized to extract antioxygenic activity in some instances, with soya bean flour, the latter produces a colloidal suspension of the soya bean particles in the water, and in such cases where such suspensions are produced, it is more desirable to produce a volatile solvent extract, as for example alcohol, and then utilize water to remove the water-soluble portion of the antioxidant.

Tests referred to above indicate that some materials like the oat flour exhibit marked antioxygenic activity, even when the insoluble portion is filtered off, and not greatly different from that of the concentrate even unfiltered, whereas the soya bean extract was found to be more effective, markedly so, in the unfiltered use. Consequently, for the securing of the maximum activity of the soya bean flour antioxidant, it may be desirable to utilize it in its unfiltered condition, in which event, it may be desirable to run the oil with the concentrate through a colloid mill in order to disperse the particles, and to expose as much of the antioxidant as possible. Such colloid mill procedure may be utilized in connection with the protection of any oils or fats or other materials by bringing such materials into intimate contact with the vegetative material to be utilized as the source of antioxidant activity.

Having thus set forth my invention, I claim:

1. A composition containing an organic substance subject to oxidative change in contact with a volatile liquid hydrocarbon soluble extract of vegetative material selected from the group consisting of cereals and grains, said extract containing a complex mixture of substances including antioxidants derived from said vegetative material, the vegetative material from which the hydrocarbon soluble extract is produced being different from the organic substance subject to oxidative change.

2. A composition containing an organic substance subject to oxidative change in contact with a gasoline soluble extract of vegetative material selected from the group consisting of oats, rye, barley, rice and corn, said extract containing a complex mixture of substances including antioxidants derived from said vegetative material, the vegetative material from which the hydrocarbon soluble extract is produced being different from the organic substance subject to oxidative change.

3. A composition containing an organic substance subject to oxidative change in contact with a gasoline soluble extract of the vegetative material oats, said extract containing a complex mixture of substances including antioxidants derived from said vegetative material, the vegetative material from which the hydrocarbon soluble extract is produced being different from the organic substance subject to oxidative change.

4. A composition containing an organic substance subject to oxidative change in contact with a gasoline soluble extract of the vegetative material barley, said extract containing a complex mixture of substances including antioxidants derived from said vegetative material, the vegetative material from which the hydrocarbon soluble extract is produced being different from the organic substance subject to oxidative change.

5. A composition containing an organic substance subject to oxidative change in contact with a gasoline soluble extract of the vegetative material rice, said extract containing a complex mixture of substances including antioxidants derived from said vegetative material, the vegetative material from which the hydrocarbon soluble extract is produced being different from the organic substance subject to oxidative change.

6. The process which comprises admixing an oleaginous substance subject to oxidative change with a volatile liquid hydrocarbon soluble extract of vegetative material selected from the group consisting of cereals and grains, said extract containing a complex mixture of substances including antioxidants derived from said vegetative material, the vegetative material from which the hydrocarbon soluble extract is produced being different from the organic substance subject to oxidative change.

SIDNEY MUSHER.